Oct. 24, 1944. K. F. NYSTROM ET AL Re 22,558

RAILROAD CAR TRUCK

Original Filed Sept. 11, 1941 3 Sheets-Sheet 1

Inventors
Karl F. Nystrom
Vernon L. Green,
By Geo. Heidner
Attorney

Oct. 24, 1944. K. F. NYSTROM ET AL Re 22,558

RAILROAD CAR TRUCK

Original Filed Sept. 11, 1941 3 Sheets-Sheet 2

Inventors

Karl F. Nystrom

Vernon L. Green

By George Heidemann

Attorney

Oct. 24, 1944.

K. F. NYSTROM ET AL

Re 22,558

RAILROAD CAR TRUCK

Original Filed Sept. 11, 1941 3 Sheets-Sheet 3

Inventors
Karl F. Nystrom
Vernon L. Green,
By Roger Heidmann
Attorney

Reissued Oct. 24, 1944 Re. 22,558

UNITED STATES PATENT OFFICE 22,558

RAILROAD CAR TRUCK

Karl F. Nystrom and Vernon L. Green,
Milwaukee, Wis.

Original No. 2,334,024, dated November 9, 1943, Serial No. 410,357, September 11, 1941. Application for reissue May 1, 1944, Serial No. 533,536

16 Claims. (Cl. 105—194)

Our invention relates more particularly to trucks for railroad passenger cars provided with what is known as "off-the-wheel" brakes involving pneumatic cylinders in connection with discs bolted or secured to the wheels of the truck.

The invention more specifically stated consists in providing the truck with equalizer units at each side on which the truck frame is yieldingly supported; each equalizer unit being provided with journal bearing housing receiving portions or yokes instead of employing the conventional pedestals on the truck frame; the two equalizer units being yieldingly connected to each other and to the truck frame by means of which the brake cylinders form a part; said means being of C-shape formation so as to permit a twisting movement which will enable a wheel at one corner of the truck to drop without elevating the opposite wheel on the same journal or axle.

Our invention is designed to eliminate transverse ties, other than the tie means mentioned of which the brake cylinders form a part and each of which is provided with a three-point suspension, namely one at an intermediate point between said tie means and the truck frame and the other between both ends and the equalizer units; with the points of suspension or connection provided with shock absorbing or resilient elements.

The invention has for its object the provision of an easier riding truck wherein the wheels can be removed without removing the brake mechanism and the wear encountered in trucks as heretofore constructed eliminated.

The objects and advantages of our invention will be readily comprehended from the following detailed description of the accompanying drawings wherein.

Our invention relates to an improved truck construction for railroad passenger cars whereby its riding qualities will be greatly improved and the noise and wear encountered with trucks as heretofore constructed will be eliminated.

In the particular exemplification of the invention, the truck frame is shown at 10 consisting of the two side beams 10ᵃ connected by the transom members 10ᵇ. The ends of the side beams 10ᵃ curve or extend downwardly and these downwardly disposed portions bifurcated as shown at 10ᶜ (see Figure 1) and the bifurcations provided with vertically disposed slots, as shown at 11 in Figure 2.

Each side of the truck is provided with our improved equalizer 12 whose ends terminate in vertically disposed journal bearing housing receiving portions or yokes 13 formed to permit vertical insertion of the bearing housings on the ends of the axles; the legs or sides of the yokes 13 being shown provided with opposingly disposed portions 14, 14 adapted to overlap the journal bearing housings and prevent outward movement of the latter.

Figure 1:
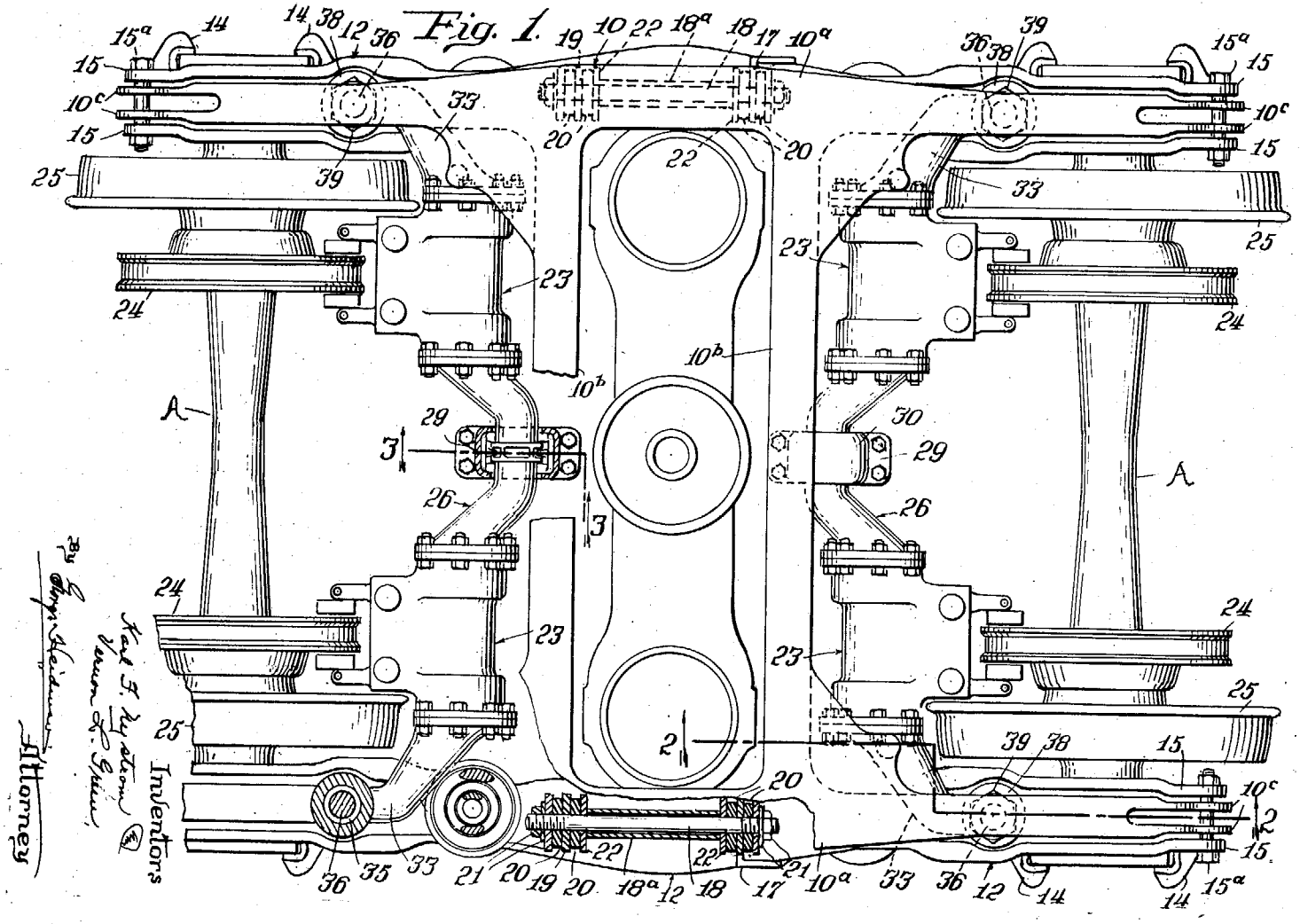
Figure 1 is a plan view of our improved truck with a portion broken away and shown in section.
Figure 2:
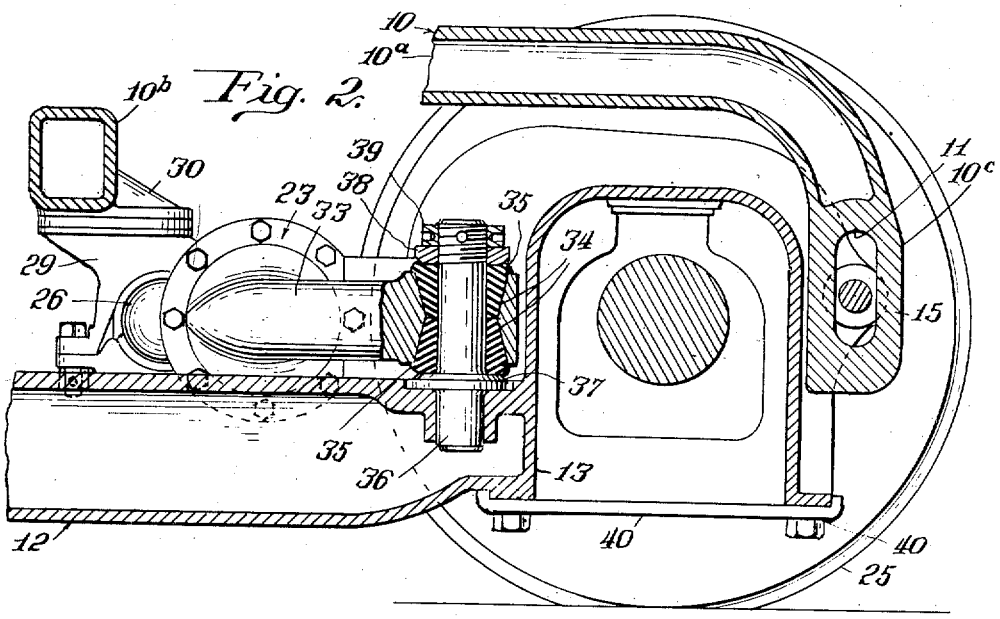
Figure 2 is a sectional view taken on the offset line 2—2 of Figure 1 looking in the direction of the arrows.

The ends of the equalizers 12, beyond the yokes 13, are extended or provided with lobes which are preferably bifurcated and straddle the end portions 10ᶜ of the side frame as shown at 15 (see Figure 1); the lobes being apertured to receive the pins 15*a* which pass through the vertical slots 11, see Figure 2, and act as a safety means to prevent dissociation of the frame and equalizers in the event of a mishap.

Figure 5:
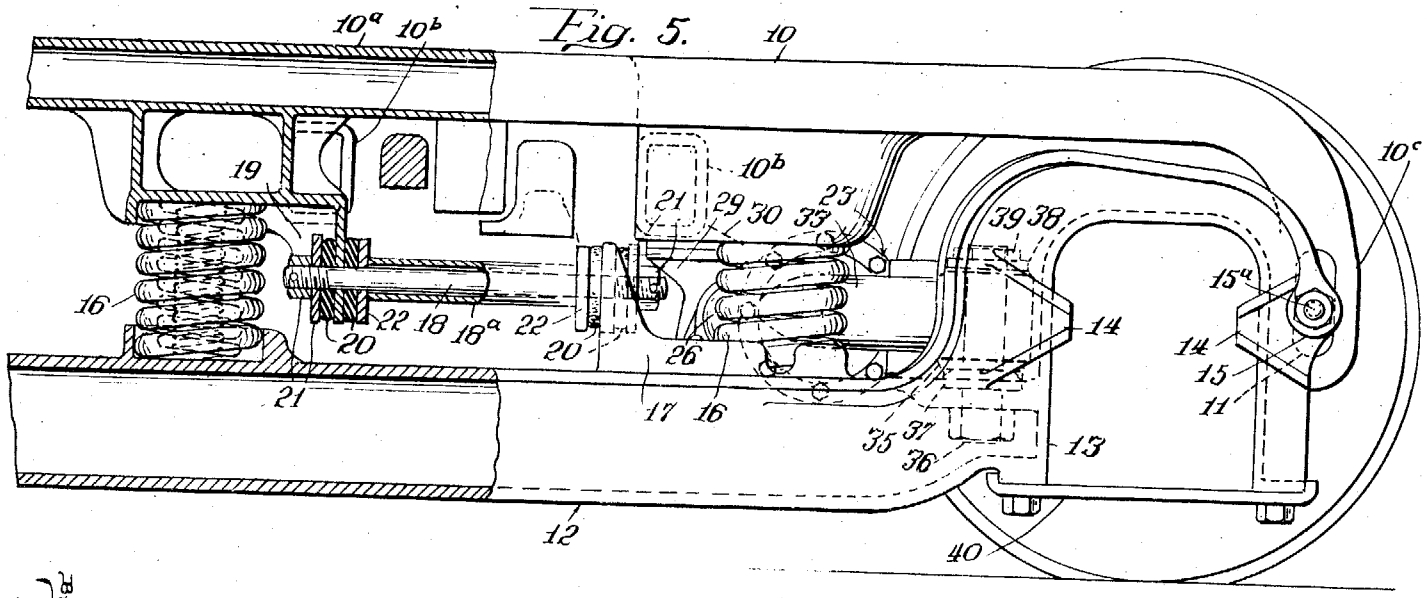
Figure 5 is a side elevation of the truck with one end broken away and a portion shown in section.

The equalizers 12, intermediate of their yokes 13, are provided with suitable spring seats on which the coil springs 16 (see Figure 5) are seated and which yieldingly support the truck frame 10; and each equalizer intermediate of the spring seats is provided with an upstanding bracket 17 (Figure 5) apertured to receive one end of the tie member or rod 18 whose other end passes through an aperture in the depending bracket 19 secured to or formed integral with the side beam or rail of the truck frame 10. The ends of the rod 18 on opposite sides of the respective brackets are provided with resilient or rubber pads 20, 20, with the outer ends of the rods provided with washers and nuts as at 21; while the rod intermediate of the brackets is provided with a sleeve 18ᵃ whose ends are provided with washers 22. As is apparent, as the nuts 21 are screwed up on the threaded ends of rod 18, the respective washers will compress the resilient elements or rubber pads 20 and provide a resilient and noiseless connection between the frame and equalizer adapted to absorb longitudinal thrusts; it being understood that a similar longitudinally disposed connection or rod is arranged on each side of the truck.

Our improved truck is designed especially for use with off-the-wheel type of brake mechanism, as for example the Budd type of brake employed with passenger car trucks whose journals are mounted in roller bearing housings; the invention being designed to eliminate transverse ties other than that involving the pneumatic cylinder castings operatively arranged between the transom members of the frame and the axles.

The general construction and arrangement of our improved tie means between the two equalizers and the truck frame is shown in Figure 1, wherein the cylinder castings of the brake mechanism are shown at 23 for effecting braking operation in the usual manner with the discs 24 secured to each wheel 25.

Figure 3:
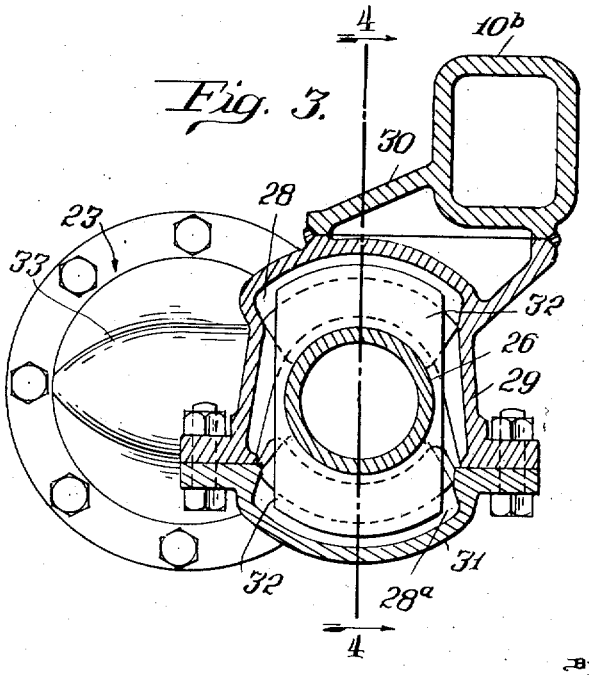
Figure 3 is a sectional view taken on the line 3—3 of Figure 1 as viewed by the arrows.
Figure 4:
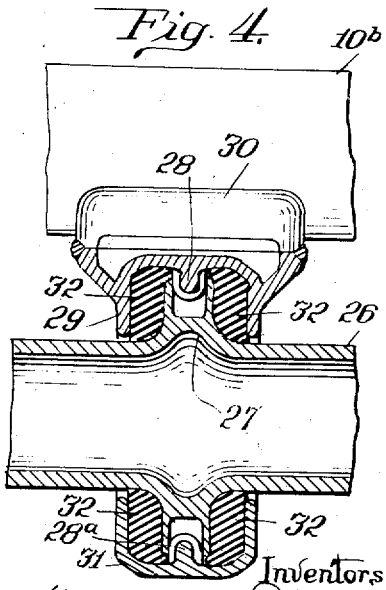
Figure 4 is a detail sectional view on the line 4—4 of Figure 3 looking in the direction of the arrows.

The inner ends of the two cylinder castings 23 arranged on the same side of a transom member 10b are connected by an offset or nose-like connecting piece 26, which is preferably tubular as shown in Figures 3 and 4; the ends of the nose connection 26 being shown bolted to the inner ends of the two cylinders 23. The intermediate offset portion of the connection member 26 is formed with an annular enlargement and socketed annular flange 27 (see Figure 4) and the socket adapted to receive a continuous rib 28 formed within the housing 29 whose upper end is intimately secured (as by welding) to the depending offset bracket 30 which may be formed integral with each transom member 10b.

The lower end of each housing 29 is provided with a removable closure member 31 which is also provided intermediate its sides with a rib 28a which constitutes a continuation of the rib 28 in the housing. The side walls of the housing 29 and of the bottom cap or closure member 31 are spaced from the ribs 28, 28a and from the annular flange 27 of the nose member 26 to receive the rubber pads 32 therebetween, namely four pads 32 which are of kidney shape so as to somewhat encircle the tubular nose member 26; one pad being disposed on the tubular member 26 between its enlargement 27 and each side wall of the housing 29, and one pad on each side of the enlargement 27 and each side wall of the closure member or cap 31; the hanger-box with the rubber pads being adapted to compensate for any relative movements between equalizers and frame and provide a non-metallic connection between the composite tie means and the transom members of the truck frame. The two upper pads 32 are first inserted into the housing; the tubular nose member 26 is then inserted through the open lower end of the housing, after which the cap or closure member 31 with the two lower pads 32 is put into place and bolted to the lower end of the housing as shown in Figure 3.

The outer ends of the cylinders 23 are each provided with an offset or angular arm 33, shown bolted to the cylinder castings, with the outer ends of the arms disposed substantially parallel with the tops of each equalizer 12 and each provided with a vertically disposed aperture which is provided with an oppositely beveled or cone-shaped inner surface as at 34, see Figure 2, and the aperture provided with the conical rubber bushings 35 which extend slightly beyond the tops and bottoms of the arms 33.

Each equalizer 12, preferably adjacent the yokes 13 thereof, is provided with the upstanding pins 36 adapted to extend through the rubber bushings 35 in the apertured ends of the arms 33; the pins 36 being provided with beveled washers or flanges 37 which engage the extended end of the lower bushing; while the upper end of the pin also is provided with a beveled washer 38 to engage the extended end of the bushing 35; the upper washer 38 being held in place by nut 39.

As shown in Figure 1, a similar combination brake cylinder and tie unit is yieldingly suspended from each transom member and thus eliminates the use of other transverse ties; the brake cylinders (two in each combination unit) acting as spacers between the added arms and the center spacer or nose members whereby the combination units are symmetrically arranged about the center line of the truck and the units yieldingly suspended at the center to the transom members of the frame.

The lower open ends of the equalizer-yokes 13 are shown provided with tie bars or straps 40, removably bolted in place and which, in addition to maintaining proper operative relation between the bearing housings on the ends of the wheel axles A and the equalizers also tend to reenforce the lower ends of the equalizer yokes.

With our improved construction, the wheels can be removed, when occasion arises, without removing the brake mechanism, the cylinders whereof are utilized in providing transverse ties between both equalizers of the truck—two ties being provided between the two equalizers and each equalizer having a draw-link connection with the truck frame, with all points of connection between the equalizers and the frame being made through shock absorbing or yielding elements.

The combination tie units between the two equalizers and the truck frame, as can be seen in the plan view Figure 1, are of C-shape formation in order to permit twisting of the tie to enable a wheel at one corner of the truck to drop without elevating the opposite wheel on the same axle; the drop being permitted by the three point suspension, namely one between the tie unit and the frame and one at each end of the unit, with each point involving shock absorbing rubber elements held under compression.

The exemplification is believed to be the best embodiment of the invention but certain structural modifications may be made without, however, departing from the spirit of our invention as defined in the appended claims.

What we claim is:

1. In a railroad car truck whose axles are provided with bearing housings and with off-wheel brake mechanism adjacent each wheel; a cylinder for each brake mechanism; an equalizer member on each side of the truck provided with bearing housing receiving yokes and with vertically disposed pins; a truck frame resiliently mounted on the equalizer members and provided with transverse transom members; a pull link between each equalizer member and the frame and having non-metallic yielding connections therewith; a pair of combination cylinder holding and tie units disposed transversely of the truck on opposite sides of the transom of the frame, each unit consisting of a pair of said cylinders, an offset connecting link between the adjacent ends of the cylinders and arms secured to the outer ends of the cylinders provided with ends disposed lengthwisely of the equalizers and connected to the vertically disposed pins; and means secured to the frame transom members whereby the intermediate portions of said tie units are suspended from the truck frame, said means involving tie unit encircling portions provided with resilient shock absorbing elements.

2. In a railroad car truck the axles whereof are provided with anti-friction bearing holding housings and brake mechanisms; an equalizer member on each side of the truck provided with vertically disposed bearing housing receiving yokes, the equalizer members each having a pair of upstanding pins; a truck frame resiliently mounted on the equalizer members and having transverse transom members, a pair of tie units between the equalizer members, each consisting of a pair of brake cylinders spaced apart transversely of the truck, a tubular crank-arm type of link secured to the opposing ends of the cylinders and an offset arm connected to the outer ends of both cylinders with the ends of said arms extending lengthwisely above the equalizer members and vertically apertured to receive said upstanding pins; rubber bushings disposed about said pins; a box-like bracket secured to each transom member and encircling the crank arm type of link of each tie unit; and rubber pads in each box-like bracket held under compression between said link and the walls of said bracket whereby twisting movements in the tie units is permitted.

3. In a railroad car truck whose axles are provided with bearing housings; a truck frame composed of side beams connected intermediate their ends by a pair of spaced transom members; an equalizer member on each side of the truck terminating at the ends in integral upstanding bearing housing receiving yokes and having vertically disposed pivot pins; and C-shape tie means between the two equalizer members yieldingly suspended at the intermediate point to a transom member so as to permit vertical twisting movement while the ends of said tie means are disposed lengthwisely of and above the equalizer members and yieldingly secured to said pivot pins to permit relative vertical movement between the truck frame and each equalizer member.

4. In a railroad car truck whose axles are provided with bearing housings; a truck frame provided with a transom member; an equalizer member on each side of the truck provided at its ends with upstanding bearing housing receiving yokes and vertically disposed pins; and tie means between the two equalizer members and the truck frame comprising a bracket secured to the transom member and provided with resilient elements, a pair of brake-applying cylinders, a crank-arm connection between the cylinders with its intermediate portion clamped between said resilient elements and within the bracket and arms secured to the opposite ends of the cylinders with their outer ends disposed lengthwisely of the equalizers and secured thereto through the medium of the vertically disposed pins.

5. In a railroad car truck whose axles are provided with bearing housings; a truck frame with transversely disposed transom members; an equalizer member on each side of the truck provided at the ends with vertically disposed bearing housing receiving yokes and vertically disposed pins adjacent the yokes; transversely disposed tie means between the two equalizer members whereby they are yieldably anchored to each other and to the transom members to permit independent vertical movement at each end of the equalizer members, the ends of said tie means extending lengthwisely of the equalizer members and yieldingly secured to said pins while the central portion of said tie means is offset laterally from the longitudinal axis of the body portion of the tie means; and means whereby said offset portion of the tie means is yieldingly secured to the adjacent transom member and twisting movement of the tie means permitted.

6. In a railroad car truck provided with off-the-wheel brakes; an equalizer member at each side of the truck provided adjacent the ends with upstanding pins; a truck frame arranged above and yieldingly supported on the equalizer members and provided with a pair of transom members; a cylinder for the brake mechanism adjacent each wheel and disposed between the transom members and the axles; a pair of combination cylinder holding and equalizer tie units disposed transversely of the truck, each composed of a pair of said cylinders, a tubular crank-like connecting link secured to the opposing ends of the pair of cylinders, and an arm secured to the outer end of each cylinder disposed lengthwisely of an equalizer member and pivoted on said upstanding pins; a rubber pad holding housing secured to each transom member and disposed about the tubular crank-like link whereby the equalizer tie unit is yieldingly suspended from the transom member; rubber pads in said housing disposed about said crank-like link; and means whereby the rubber pads are placed under compression about the tie units and the latter yieldingly held in place and independent movement of the equalizer members permitted.

7. In a railroad car truck, a journal bearing housing holding equalizer member on each side of the truck provided with upstanding pins adjacent the ends; a truck frame resiliently mounted on the equalizer members and provided with transversely disposed transom members; C-shape tie units disposed transversely of the truck adjacent the transom members and between the two equalizer members, the ends of the units being disposed lengthwisely of the equalizer members and yieldingly mounted on said pins; rubber pad holding housings secured to the transom members adjacent the longitudinal center line of the truck and adapted to receive the intermediate portion of the tie units to suspend the latter in place; rubber pads arranged in said housings about said tie units; and means whereby the rubber pads are compressed into holding relation with the tie units and rotative movement of the units restricted.

8. In a railroad car truck with off-the-wheel brake mechanism, a journal bearing housing holding equalizer on each side of the truck provided with upstanding pins adjacent the ends and each having a bracket intermediate its ends; a truck frame resiliently mounted on the equalizer members and having transversely disposed transom members intermediate the ends, the side members of the frame each having a depending bracket intermediate the ends arranged in alignment with the brackets of the equalizers; a pull rod on each side of the truck connected with the equalizer bracket and with the frame bracket; tie means between the equalizers comprising the cylinders of the brake mechanism, a crank-arm type connection between the adjacent ends of the cylinders, a bracket-housing disposed about said crank-arm connection and secured to a transom member of the truck frame, angular arms secured to the outer ends of the cylinders with their free ends arranged above the equalizers and pivoted on said upstanding pins; and means for yieldingly resisting the free oscillatory movements of said tie means.

9. In a truck and brake organization, a pair of spaced wheel and axle assemblies each including axle extensions outside the wheels thereof, a pair of side frame members each including end pedestals for embracing the adjacent ends of the wheel and axle assemblies, said side frame members comprising the sole means for longitudinally spacing the opposite ends of the axles, and a pair of spaced transverse members interconnecting the side frame members, said transverse members each comprising as structural parts thereof brake cylinder units including non-rotary brake members for cooperation with rotary brake members mounted to rotate with the wheels of the adjacent wheel and axle assembly, the connections between the side frame members and wheel and axle assemblies and the transverse members being flexible to permit the limited relative tilting of the axles due to track irregularities without imposing undue strain on the parts.

10. In a truck and brake organization, a pair of spaced wheel and axle assemblies each including axle extensions outside the wheels thereof, a pair of equalizers each including end pedestals for embracing the adjacent ends of the wheel and axle assemblies, said equalizers comprising the sole means for longitudinally spacing the opposite ends of the axles, a truck frame supported from said equalizers, and a pair of spaced transverse members interconnecting the equalizers, the connections between the equalizers and wheel and axle assemblies and the transverse members being flexible to permit the limited relative tilting of the axles due to track irregularities without imposing undue strain on the parts, there being non-rotary brake structure associated with said transverse members and cooperating rotary brake members mounted to rotate with the wheels of the adjacent wheel and axle assembly, said brake structure and brake members being arranged to interengage at points spaced longitudinally of the truck from said transverse members and each of the latter being connected to the equalizers and to the truck frame at points spaced apart longitudinally of the truck to resist torque reactions due to application of the brakes.

11. In a truck and brake organization, a pair of spaced wheel and axle assemblies, side members extending longitudinally of the truck and carried upon said wheel and axle assemblies, a member extending transversely of the truck with its ends connected to said side members at points spaced longitudinally of the truck from the supports for the side members on said wheel and axle assemblies, the connections between the side members and said wheel and axle assemblies and the transverse member being flexible to permit limited tilting of the axle relative to the side members and the transverse member without imposing undue strain on the parts, there being non-rotary brake structure including a power device associated with said transverse member and cooperating rotary brake members mounted to rotate with the wheels of the adjacent wheel and axle assembly.

12. In a truck and brake organization, a pair of spaced wheel and axle and axle journal box assemblies each including axle extensions outside the wheels thereof, a pair of side frame members each including end pedestals for embracing the adjacent ends of the wheel and axle assemblies, said side frame members comprising the sole means for longitudinally spacing the opposite ends of the axles, and a pair of spaced transverse members interconnecting the side frame members, the connections between the side frame members and wheel and axle assemblies and the transverse members being flexible to permit the limited relative tilting of the axles due to track irregularities without imposing undue strain on the parts, there being non-rotary brake structure associated with said transverse members independently of said assemblies, and cooperating rotary brake members mounted to rotate with the axles and positioned between the wheels of the respective axles and closer to the axle than the wheel periphery, the assemblies being removable from the truck without disassembling the side frame members and the non-rotary brake structure and other truck parts.

13. In a truck and brake organization, a pair of spaced wheel and axle and axle journal box assemblies each including axle extensions outside the wheels thereof, a pair of side frame members each including end pedestals for embracing the adjacent ends of the wheel and axle assemblies, said side frame members comprising the sole means for longitudinally spacing the opposite ends of the axles, and a transverse member interconnecting the side frame members, the connections between the side frame members and wheel and axle assemblies and the transverse member being flexible to permit the limited relative tilting of the axles due to track irregularities without imposing undue strain on the parts, there being non-rotary brake structure associated with said transverse member independently of said assemblies and extending into the space between the wheels, and a brake disc of less diameter than the wheels mounted on the axle between the wheels and having braking surfaces facing towards the wheels, the assemblies being removable from the truck without disassembling the side frame members and the non-rotary brake structure and other truck parts.

14. In a railroad vehicle truck with spaced wheel and axle assemblies provided with bearing housings and an equalizer member at each side of the truck, supported at its ends on said bearing housings, and a rigid truck frame including longitudinal members at the sides of the truck spring-supported on said equalizer, a member extending transversely of the truck adjacent to one of the wheel and axle assemblies and flexibly supported at its ends on said equalizers and being free of other connection to said wheel and axle assembly, brake elements, including cylinders with pistons and shoes, associated with said transversely extending member, and cooperating brake elements associated with said wheel and axle assembly, the wheel and axle assembly and the brake elements associated therewith being removable from the truck while said equalizer, truck frame, transverse member and the brake elements thereon remain assembled.

15. In a railroad vehicle truck with spaced wheel and axle assemblies provided with bearing housings and an equalizer member at each side of the truck, supported at its ends on said bearing housings, and a rigid truck frame including longitudinal members at the sides of the truck spring-supported on said equalizer, a member extending transversely of the truck adjacent to one of the wheel and axle assemblies and having connections to the equalizer members, the connections between said transverse member and said equalizer members holding the adjacent portions of the latter against relative movement transversely of the truck, said connections being flexible to permit the limited relative tilting of the axles due to track irregularities without imposing undue strain on the parts, there being non-rotary brake structure, including a power device, associated with said transverse member and cooperating rotary brake members mounted to rotate with the wheels of the adjacent wheel and axle assembly.

16. In a truck and brake organization, a pair of spaced wheel and axle assemblies each including axle extensions outside the wheels thereof, a pair of side frame members each including end pedestals for embracing the adjacent ends of the wheel and axle assemblies, said side frame members comprising the sole means for longitudinally spacing the opposite ends of the axles, and a transverse member having connections at its ends to the side frame members adjacent to one of the axles and securely holding the portions of the side frame members adjacent said axle against relative movement transversely of the truck, the connections between the side frame members and wheel and axle assemblies and the transverse member being flexible to permit the limited relative tilting of the axles due to track irregularities without imposing undue strain on the parts, a non-rotary brake structure, including a power device, associated with said transverse member, and cooperating brake members carried by and rotating with the adjacent wheel and axle assembly.

KARL F. NYSTROM.
VERNON L. GREEN.